March 27, 1956

S. M. PARKER 2,739,678

CONTROL MECHANISM FOR THE TRANSMISSION
SYSTEMS OF MOTOR VEHICLES

Filed June 22, 1953

Inventor
Sydney M. Parker
by Stevens, Davis, Miller & Mosher
his attorneys

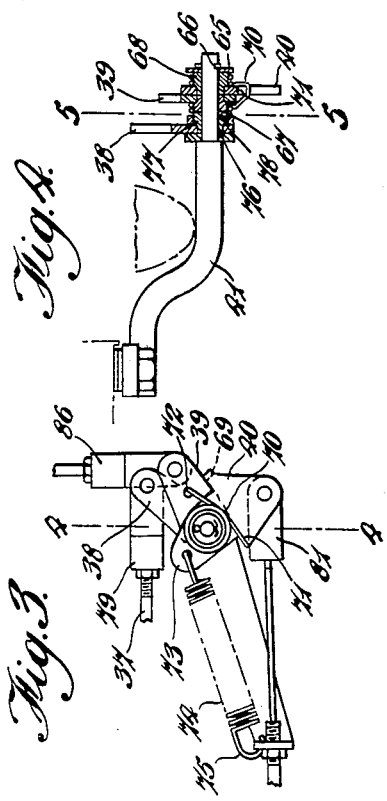

March 27, 1956  S. M. PARKER  2,739,678
CONTROL MECHANISM FOR THE TRANSMISSION
SYSTEMS OF MOTOR VEHICLES
Filed June 22, 1953  4 Sheets-Sheet 3

Inventor
Sydney M. Parker
by Stevens, Davis, Miller & Mosher
his attorneys

March 27, 1956  S. M. PARKER  2,739,678
CONTROL MECHANISM FOR THE TRANSMISSION
SYSTEMS OF MOTOR VEHICLES
Filed June 22, 1953  4 Sheets-Sheet 4
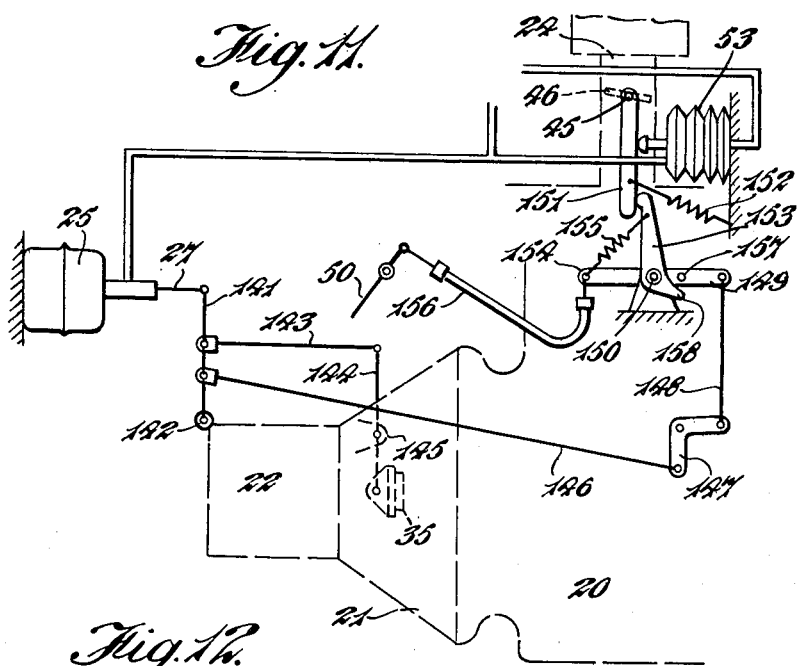
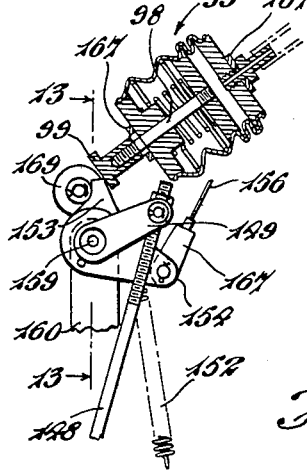
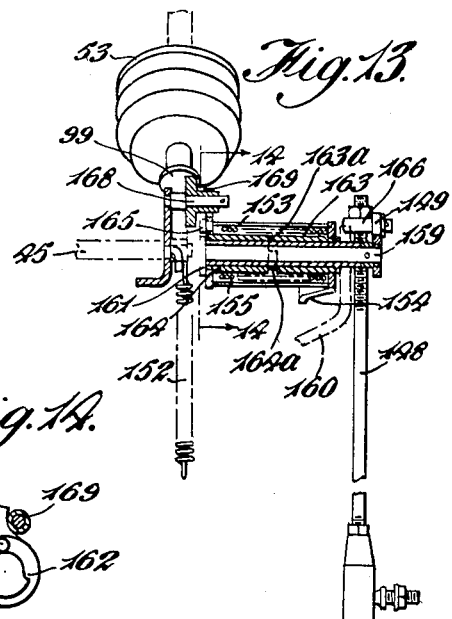
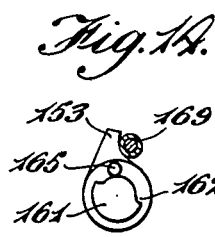

United States Patent Office 2,739,678
Patented Mar. 27, 1956

2,739,678

CONTROL MECHANISM FOR THE TRANSMISSION SYSTEMS OF MOTOR VEHICLES

Sydney M. Parker, Leamington Spa, England, assignor to Automotive Products Company Limited, Leamington Spa, England Application June 22, 1953, Serial No. 363,306

3 Claims. (Cl. 192—.08)

This invention relates to control mechanism for the type of transmission system of motor vehicles which comprises a variable speed gear-box having a plurality of constant mesh gear trains selectively brought into action by the engagement of positive clutches, the mating elements of the said clutches being brought to the same or substantially the same speed prior to engagement by friction means; and a friction clutch through which the power is transmitted from the engine to the gear-box.

In our co-pending patent application No. 271,606, now Patent No. 2,720,295, dated October 11, 1955, we have described a control mechanism comprising, in combination, a movable member which effects directly the engagement of the positive clutches in the gear-box, servo devices controlled by said movable member and acting to disengage the friction clutch and limit the opening of the engine throttle during a gear change, and means sensitive to relative rotation of the driving and driven members of the friction clutch for holding said clutch disengaged and at the same time adjusting the throttle to vary the speed of the driving member, said means permitting re-engagement of the clutch only on the establishment of a predetermined speed relation between the driving and driven members of the clutch.

In the arrangement described in that application, the release of the clutch, and the limiting of the opening of the engine throttle were effected by two separate pneumatic servo devices controlled by a common valve. The object of the present invention is to provide a modified arrangement in which proper co-ordination between the clutch release and the throttle position is more positively ensured, and, with that object in view, according to the invention, the disengagement of the clutch, and the limitation of the throttle opening are both effected by a common servo-motor.

The limiting of the throttle valve opening is preferably effected by the servo-motor through linkage including a lost motion connection so arranged that when the servo-motor is inoperative the throttle valve is movable throughout its full range of movement without taking up the said lost motion.

In the accompanying drawings:

Figure 2 is an enlarged view in elevation showing part of the control mechanism of Figure 1;

Figure 3 is an elevation, on the same scale as Figure 2, of a part of the mechanism shown in Figure 2, the mechanism being viewed from the opposite direction;

Figure 4 is a section on the line 4—4 of Figure 3;

Figure 5 is a section on the line 5—5 of Figure 4;

Figure 11 is a diagrammatic view, similar to Figure 1, of another arrangement of control mechanism according to the invention;

Figure 12 is a side elevation, on a larger scale, of part of the mechanism shown in Figure 11;

Figure 13 is a sectional elevation, the section being taken on the line 13—13 of Figure 12; and Figure 14 is a scrap section on the line 14—14 of Figure 13.

Figures 1, 6:
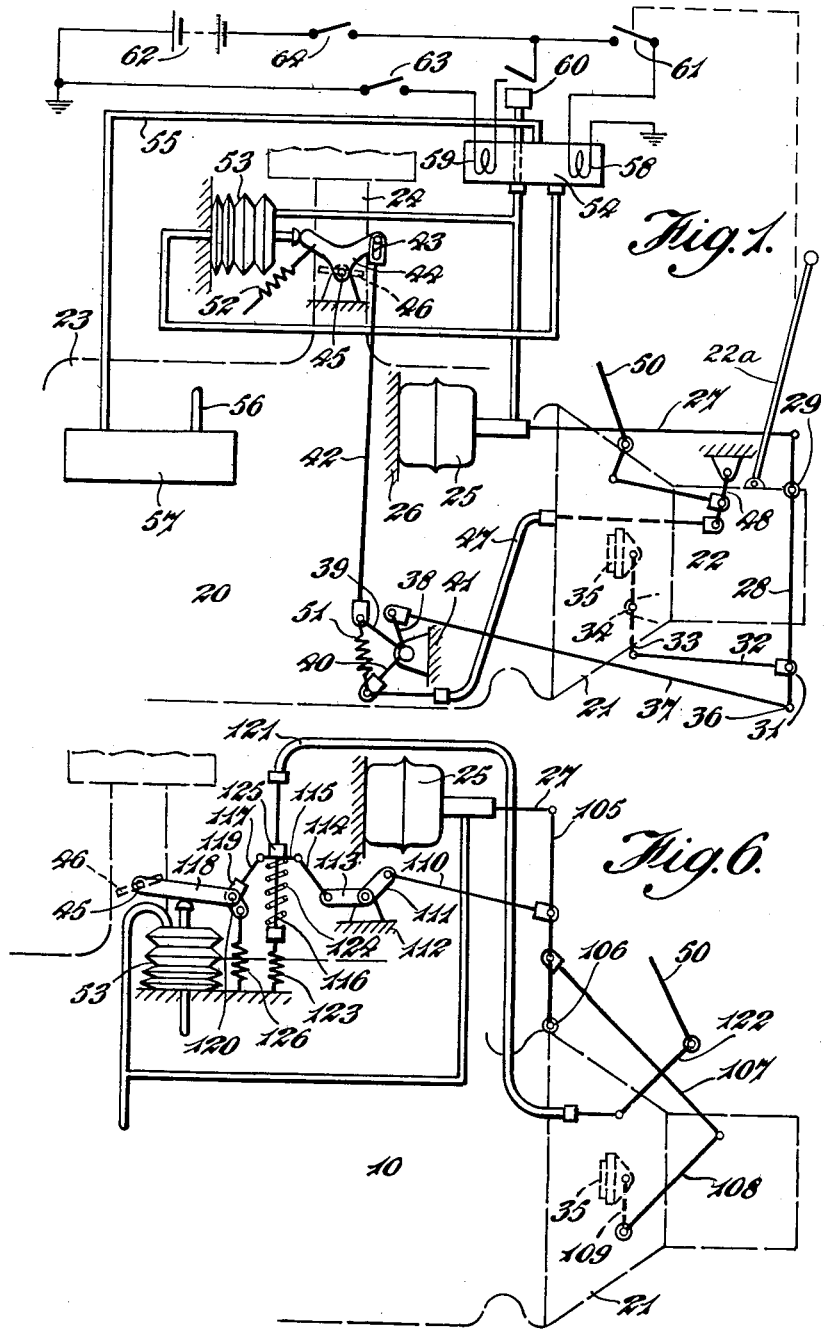
Figure 1 is a diagrammatic illustration of one arrangement of control mechanism according to the present invention.
Figure 6 is a diagrammatic view, similar to Figure 1, of another arrangement of control mechanism according to the invention.

Referring to Figure 1, the engine of a motor vehicle is indicated at 20, the clutch housing at 21, and the gear-box at 22. The inlet manifold of the engine is shown at 23, and the carburettor at 24.

A vacuum servo-motor 25, shown as being mounted on a bracket 26 on the engine 20, acts through a pull rod 27 on a lever 28 pivotally mounted at 29 on the gearbox 22, the lever 28 being pivotally connected at 31 to a link 32 which is pivotally connected at its other end to a clutch throw-out lever 33 mounted on a bracket 34 inside the clutch housing 21, the throw-out lever 33 being connected to a clutch release bearing 35 which acts, in the known manner, on the release levers of a plate-type friction clutch (not shown), to disengage the clutch. It will thus be seen that a pull applied to the pull rod 27 by the servo-motor 25 will release the clutch. Also connected to the lever 28, at 36, is a pull rod 37, the other end of which is pivotally connected to an arm 38 mounted, with two other arms 39 and 40, on a bracket 41 carried by the engine 20. The arm 39, which constitutes a throttle operating member, is connected by a pull rod 42, having a slotted head 43 at its upper end, to one arm of a bell-crank lever 44 fixed to the spindle 45 of the throttle valve 46 in the carburettor 24, and the arm 40 is connected, by a Bowden cable 47, to an arm 48 operable through a link 49 by a throttle control pedal 50. The arms 39 and 40 are coupled one to the other by a spring 51 shown as a tension spring, and the arm 38 has a lost motion connection with the arm 39 such that, when the arm 38 is in the position which it takes up when the servo-motor 25 is inoperative, the arm 39 is free to move through an arc sufficient to move the throttle valve through its full range, whereas when the servo-motor 25 is energised to release the clutch, the arm 39 is able to move only a short distance from the throttle-closed position. The connections between the arms 38, 39 and 40 are described more fully below, with reference to Figures 2 to 5.

The bell-crank lever 44 is urged towards the throttle-closed position by a spring 52, and a vacuum servo-motor 53 acts on the second arm of the said lever 44 to urge the throttle valve 46 towards the open position.

The suction for operating the servo-motors 25 and 53 is derived from the inlet manifold 23 of the engine, the operation of the servo-motors being controlled by a solenoid operated valve 54 connected to the manifold 23 through pipes 55, 56 and a vacuum reservoir 57.

The servo-motor 53, which will be more fully described below, has two chambers, suction in one of which tends to open the throttle valve 46 whilst suction in the other acts in the opposite direction. The former chamber of the servo-motor 53, and the servo-motor 25, have a common connection to the valve 54, and the latter chamber is separately connected to the valve 54. The valve 54 is operated, as described in our U. S. patent application No. 271,606, by two solenoids 58 and 59, energization of the solenoid 58 connecting both chambers of the servo-motor 53, and the servo-motor 25, to the vacuum reservoir 57, whilst energization of the solenoid 59 connects only the one chamber of the servo-motor 53, and the servo-motor 25, to the vacuum reservoir. A vacuum-operated electric switch 60 is connected to the valve 54 in common with the servo-motor 25 and the one chamber of the servo-motor 53.

A switch 61, operated, as described in our United States patent application No. 271,606, by the gear-change lever 22a of the vehicle so as to be closed when the said lever is in the neutral position, closes an electric circuit containing the solenoid 58 and a battery 62, so that that solenoid is energized when the gear-change lever is moved to the neutral position, and is de-energized when any gear is engaged. Energization of the solenoid 58 causes the vacuum-operated switch 60 to close, and a further switch 63, associated with the clutch of the vehicle as described in our U. S. patent application No. 271,606 is closed when the driven member of the clutch over-runs the driving member and opened when the driving member over-runs the driven member.

The ignition switch of the vehicle is shown at 64, this switch, when open, opening the circuit of the solenoid 58.

When the vehicle is in motion, with a gear engaged, the solenoids 58 and 59 are de-energised and both servo-motors are connected to the atmosphere, so that they are inoperative. Movement of the gear-change lever to change the gear ratio takes it first to the neutral position, thus closing the switch 61 to energise the solenoid 58, thereby operating the servo-motor 25 to release the clutch and move the arm 38 through the pull rod 37 to take up the lost motion between the arms 37 and 39 and displace the latter arm in such a direction that the throttle valve 46 is allowed to move towards the closed position under the influence of the spring 52, assuming that the throttle pedal 50 is in a position to hold it more widely open. The servo-motor 53 remains inoperative, since suction is applied to both of its chambers. The vacuum switch 60 is closed. Continued movement of the gear lever into the new gear position re-opens the switch 61 and de-energizes the solenoid 58. If the engine speed and the road speed are so related that the driving member of the clutch is turning faster than the driven member, the switch 63 remains open, the servo-motors are de-energised, and the clutch re-engages, but if the driving member of the clutch is turning more slowly than the driven member the switch 63 closes, and vacuum is maintained in the servo-motor 25, and also in the chamber of the servo-motor 53 in which it acts to open the throttle valve 46, such opening being permitted by the slot 43 in the head of the pull rod 42. The opening of the throttle valve speeds up the engine until the driving member of the clutch over-runs the driven member, when the switch 63 is opened and the servo-motors de-energised, thus allowing the clutch to re-engage.

The above brief description of the operation of the system as a whole is given by way of explanation, the operation of the system being described in detail in U. S. patent application No. 271,606.

Referring now to Figures 2 to 5, the bracket 41 is shown as a cranked bar reduced at its free end to form a spindle for the arms 38, 39 and 40; all of which are retained thereon by a washer 65 and a split pin 66. The arms 39 and 40 are fixedly mounted respectively on hubs 67 and 68, and the arm 39 is formed with a lug 69, bent over so as to lie in the path of the arm 40. The arm 40 is urged against the lug 69 by a U-shaped spring 70, corresponding to the spring 51 in Figure 1, the bend of which bears on a projection 71 on the arm 39, whilst its ends are engaged in a hole 72 in the arm 40. A coiled portion of each arm of the spring 70 surrounds the spindle on which the arms are mounted. The arm 39 is integral with an ear 73 projecting on the opposite side of the arm pivot, and a tension spring 74 acts between the said ear 73 and a suitable fixed anchorage at 75.

The arm 38 is also mounted fixedly on a hub 76 which hub is formed with a dog 77 co-operating with a similar dog 78 on the hub 67 of the arm 39, the dogs 77 and 78 being so arranged that each arm has substantial freedom for angular movement independently of the other.

The arm 38 is connected by a clevis 79 to the pull rod 37, the other end of which is secured to a swivel member 80 mounted on the lever 28. The arm 40 is connected by a clevis 81 to the inner wire of the Bowden cable 47, the other end of which is connected by a second clevis 82 to the arm 48, pivoted on a bracket 83 secured to the floorboards 84 of the vehicle. The link 49 connects the arm 48 to an arm 85 moving with the throttle control pedal 50. The arm 39 is connected by a clevis 86 to the pull rod 42, the slotted head 43 of which engages a pin 87 carried by one arm of the bell-crank lever 44. The servomotor 53 is mounted between the arms 88 and 89 of a U-shaped bracket suitably fixed to a support 91, the servomotor comprising a bellows 92 extending between end plate 93 and 94 fixed respectively to the two arms of the bracket, and a movable plate 95 dividing its interior into two chambers 96 and 97. The movable plate 95 carries a rod 98 projecting through the centre of the plate 94 and carrying on its outer end a head 99 co-operating with a roller 100 in the bell crank lever 44. A return spring 101 in the chamber 97 urges the movable plate 95 away from the plate 94. The chamber 96 of the servomotor 53 is connected by a flexible pipe 102 to the solenoid-operated valve only, the chamber 97 being connected by a flexible pipe 103 to both the solenoid-operated valve and the servomotor 25. The bell-crank lever 44 is urged by the spring 52 towards the throttle-closed position.

The parts are shown in Figures 2 to 5 in the positions which they occupy when the throttle valve is closed and the servo-motors 25 and 53 are both inoperative. The throttle valve is free for operation by the pedal 50 through the Bowden cable 47, arm 40, spring 70, arm 39 and pull rod 42, the dog 78 having sufficient free angular movement to enable the throttle valve to be moved through its full range of movement. When the servomotor 25 is energised to release the clutch, the dog 77 is moved anti-clockwise from its position shown in Figure 5. This restricts clockwise movement of the dog 78, and thus limits the downward movement of the pull rod 42 to open the throttle. If the throttle control pedal 50 is being held in such a position that it would hold the throttle open, the dog 78 engages the dog 77 and moves the arm 39 relative to the arm 40 against the resistance of the spring 70, so that the throttle opening is reduced regardless of the position of the pedal. The main resistance to movement of the throttle control pedal is provided by the spring 74 which acts directly on the arm 40, so that closing of the throttle by the servo-motor 25 does not substantially affect the "feel" of the pedal 50. The throttle valve is moved positively by the pull rod 42 only in the opening direction, the pin 87 being normally held in the upper end of the slot in the head 43 by the spring 104. When the servo-motor 25 is de-energised, the throttle valve returns to the position determined by the setting of the throttle control pedal 50.

Suction acting in the chamber 97 of the servo-motor 53 tends to move the head 99 in a direction to open the throttle valve, and when, as described above, only that chamber of the servo-motor 53 is connected to the vacuum reservoir, the throttle valve is opened, the pin 87 riding down the slot in the head 43 to permit the opening movement.

It will be seen from the above description that the dog 77 acts as a stop, responsive to movement of the servo-motor 25, serving to prevent opening of the throttle valve beyond a certain degree by the pedal control, and the head 99 acts as a stop, responsive to movement of the servo-motor 53, serving to prevent closing of the throttle valve beyond a certain degree by the pedal control.

The arrangement shown in Figure 6 differs from that shown in Figure 1 only in the connections between the servo-motors, the clutch release bearing, and the throttle valve. The parts which correspond to parts shown in Figure 1 are indicated by the same reference numeral.

The vacuum servo-motor 25 acts through its pull rod 27 on a lever 105 pivotally mounted at 106 on the clutch housing 21. The lever 105 is coupled by a pivoted link 107 to a lever 108 fixed to a spindle projecting into the clutch housing 21 and carrying a fork 109 co-operating with the release bearing 35. Also pivotally connected to the lever 105 is a thrust rod 110 the other end of which is pivotally connected to an arm 111 pivotally mounted on a bracket 112 adjacent the carburetor 24. An arm 113 is pivoted co-axially with the arm 111, and has an angular lost-motion connection therewith, the arm 113 being connected by a link 114 to a crosshead 115 mounted on a rod 116, the crosshead being also connected, by a link 117 to an arm 118 mounted on the throttle valve spindle 45 and thus constituting the throttle operating member. The link 117 is slotted at 119 to engage, with lost motion, a pin 120 in the arm 118. The rod 116 is connected at one end to the inner wire of a Bowden cable 121 the other end of which is connected to an arm 122 moving with the throttle control pedal 50, the other end of the rod being connected to a return spring 123. A spring 124 surrounding the rod 116 urges the crosshead 115 against a stop 125 on the rod. The servo-motor 53 acts on the arm 18 to move the throttle valve towards the open position, and a return spring 126 urges the throttle valve towards the closed position.

The solenoid operated valve, vacuum reservoir and electrical circuit have been omitted from this figure, since they are identical with those shown in Figure 1.

Figure 7:
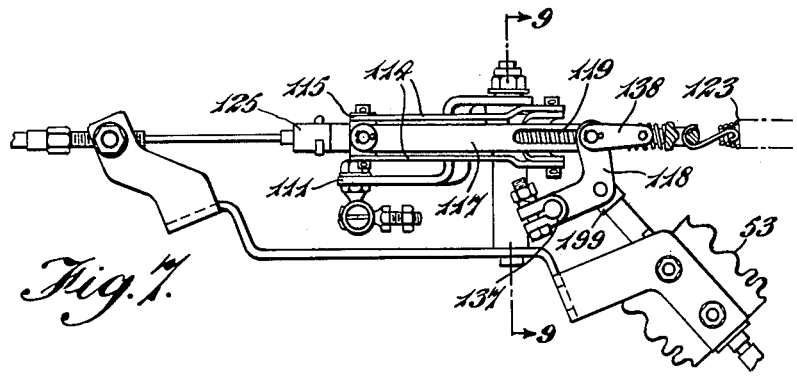
Figure 7 is an elevation, on an enlarged scale, of part of the mechanism shown in Figure 6.
Figure 8:
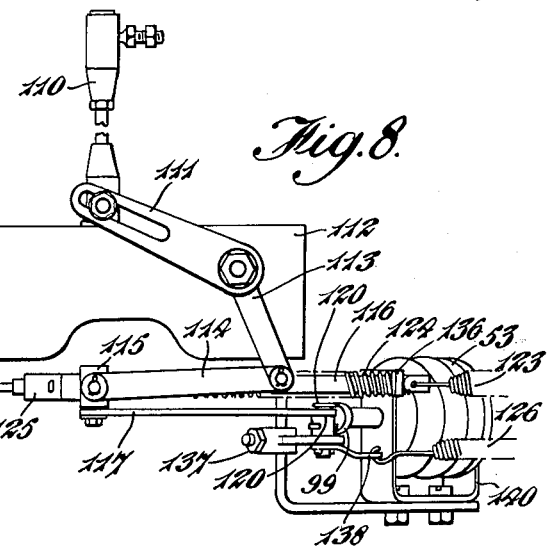
Figure 8 is a plan view of the mechanism shown in Figure 7.
Figures 9, 10:
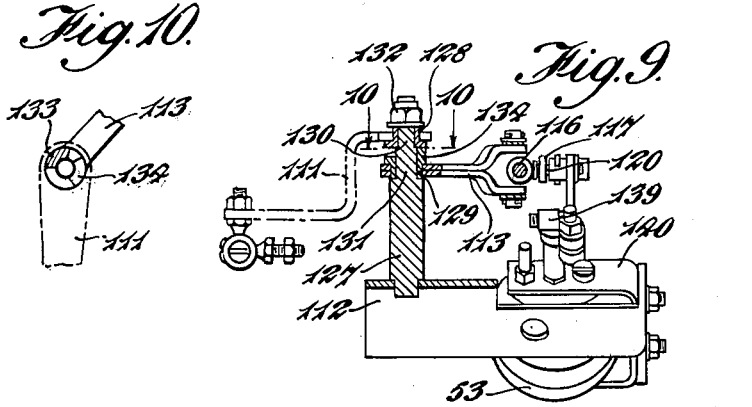
Figure 9 is a section on the line 9—9 of Figure 7.
Figure 10 is a section on the line 10—10 of Figure 9.

Figures 7, 8, 9 and 10 show, in greater detail, the parts in the vicinity of the throttle valve, the carburetor itself being omitted. The arms 111 and 113 are pivotally mounted on a post 127 fixed to the bracket 112, the arm 111 being secured to a hub 128, and the arm 113 being secured to a hub 129. The post 127 is reduced in diameter in two steps, the hub 128 being mounted on the smaller reduced portion 130, and the hub 129 being mounted on the larger reduced portion 131. Both hubs are held in position by a nut 132 engaging a screw thread on the end of the post. The hub 128 of the arm 111 is formed with a dog 133 (Figure 10) and the hub 129 of the arm 113 is formed with a dog 134, the two dogs co-operating in the same manner as the dogs 77 and 78 described with reference to Figures 2 to 5. The outer casing of the Bowden cable 121 abuts against a stop 135 carried by the bracket 112, the inner wire being secured to a head on the rod 116 constituting the stop 125. The rod 116 has another head 136 at its opposite end constituting a stop for the spring 124. The arm 118 is in the form of a bell-crank provided on one arm with a clamp 137 to engage the throttle valve spindle, and on the other arm with the pin 120 which engages in the slot 119 in the link 117. The throttle closing spring 126, which has been omitted from Figure 7 is, as shown in Figure 8, connected to a link 138 mounted on the pin 120, the spring 126, and the spring 123 being suitably anchored by means (not shown) to fixed points on the vehicle engine. A roller 139 (Figure 9) mounted at the elbow of the bell-crank lever 118 co-operates with the head 99 on the rod of the servo-motor 53, the servo-motor being mounted in a U-shaped bracket 140 secured to the main bracket 112. The links 114 and 117 extend substantially parallel to the rod 116, in planes at right-angles to each other.

The parts are shown in Figures 7 to 10 in the positions which they take up when the throttle valve is closed and the servo-motors 25 and 53 are both inoperative. The throttle valve 46 is free for operation by the pedal 50 through the Bowden cable 121, being opened by a pull on the Bowden cable acting through the link 117, and being closed by the spring 126 when the pull on the cable is relaxed. The link 114 moves with the link 117 during such operation of the throttle valve, and therefore moves the arm 113 about its pivot, the angular clearance between the dogs 133 and 134 allowing such movement without corresponding movement of the arm 111. When the servo-motor 25 is energized to release the clutch, the dog 133 is moved anti-clockwise from the position shown in Figure 10. This restricts clockwise movement of the dog 134 and of the arm 113, and thus limits the movement of the link 117 to open the throttle valve, the crosshead 115 being moved along the rod 116 against the resistance of the spring 124 if the pedal 50 is held in such a position that it would normally open the throttle valve. The main resistance to movement of the throttle valve by the pedal 50 is exerted by the spring 123, so that the closing of the throttle valve by the servo-motor 25 does not materially affect the "feel" of the pedal 50. When the servo-motor 25 is de-energised the throttle valve returns to the position determined by the position of the pedal 50.

The servo-motor 53, when energised, projects the head 99 into the path of the roller 139. If the throttle valve is closed when the servo-motor 53 is energised the head 99 engages the roller 139 and opens the said valve, the pin 120 sliding idly in the slot 119 in the link 117.

It will be seen that the dog 133 acts as a stop, responsive to operation of the servo-motor 25, to prevent opening of the throttle valve beyond a certain degree by the pedal control, and the head 99 acts as a stop, responsive to operation of the servo-motor 53, to prevent closing of the throttle valve beyond a certain degree.

Figure 11 shows another arrangement of the connections between the servo-motors, the clutch release bearing and the throttle valve. The parts which correspond to parts shown in Figure 1 are indicated by the same reference numerals, and, as in Figure 6, certain parts are omitted.

The vacuum servo-motor 25 acts through its pull rod 27 on a lever 141 pivotally mounted at 142 on the gear-box 22, the lever 141 being coupled by a pivoted link 143 to a lever 144 pivotally mounted on a bracket 145 in the clutch housing 21 and co-operating with the clutch release bearing 35. Also pivotally connected to the lever 141 is a pull rod 146, the other end of which is pivotally connected to one arm of a bell-crank lever 147 pivotally mounted at its elbow on a suitable bracket (not shown) on the engine 20, the other arm of the bell-crank lever 147 being connected by a pull rod 148 to an arm 149 movable about a pivot axis at 150 adjacent the carburetor 24.

The throttle valve 46 is mounted on the usual spindle 45, the spindle carrying an arm 151 urged by a light return spring 152 towards the throttle-closed position. An arm 153 constituting the throttle operating member is mounted co-axially with the arm 149 engages the arm 151 and acts to move the latter in a direction to open the throttle valve. A third arm 154 is also mounted on the axis at 150, the arm 154 being connected by a spring 155, shown diagrammatically as a tension spring, to the arm 153, and being also connected by a Bowden cable 156, to the throttle control pedal 50. The arms 149 and 153 have inter-engaging elements shown as a pin 157 on the arm 149 and a tail 158 on the arm 153 so arranged that the distance through which the arm 153 can be moved in an anti-clockwise direction depends on the position of the arm 149. The servo-motor 53 acts on the arm 151 in a direction to open the throttle valve as in the previously described arrangements.

Figures 12, 13 and 14 show a constructional form of the arrangement described with reference to Figure 11, so far as the parts in the vicinity of the throttle valve are concerned. The arm 149 is fixedly mounted on one end of a spindle 159 mounted co-axially with the throttle valve spindle 45 in a bracket 160 suitably attached to the vehicle engine, the spindle 159 having mounted on its other end a disc 161 having an arcuate notch 162 as shown in Figure 14. The arm 154 is fixedly mounted on a sleeve 163 rotatable on the spindle 159, and the arm 153 is similarly mounted on a second sleeve 164, the sleeves being formed with longitudinally overlapping lugs 163a and 164a (Figure 13), and a coiled spring constituting the spring 155 being mounted around the two sleeves 163 and 164 and acting to urge the lugs 163a and 164a into engagement with each other. The arm 153 carries a pin 165 lying in the notch 162 on the disc 161, the pin 165 and the disc constituting the inter-engaging elements corresponding to those shown diagrammatically at 157 and 158 in Figure 11. The pull rod 148 passes through a swivel block 166 on the arm 149, the end of the pull rod being screw-threaded to receive a nut which engages the swivel block.

The inner wire of the Bowden cable 156 is connected to a clevis 167 pivotally attached to the arm 154. The arm 151 on the throttle valve spindle 45 carries a pin 168 on which is mounted a stepped roller 169 the smaller diameter of which co-operates with the arm 153, whilst the larger diameter co-operates with the head 99 on the rod 98 of the servo-motor 53. The spring 152 is connected at one end to the arm 151, and at the other end to a fixed anchorage (not shown). The servo-motor 53 is mounted in a U-shaped bracket as in the previous examples, the arms of the bracket being shown at 167.

The positions of the parts shown in Figures 12 to 14 are those which they take up when the throttle valve is closed and the servo-motors 25 and 53 are inoperative. The throttle valve is free for movement through its full range under the control of the pedal 50 which turns the arms 154 anti-clockwise as shown in Figure 12, through the Bowden cable 156, and so turns also the arm 153, which engages and turns the arm 151 to open the throttle valve, closing of the throttle valve when the pedal is released being effected by the spring 152. The spring 155 ensures that the arm 153 moves with the arm 154, and the pin 165 has sufficient free movement in the notch 162 to allow the required range of movement of the throttle valve.

When the servo-motor 25 is energised, the arm 149 is turned clockwise as viewed in Figure 12, thus also turning the disc 161 and bringing one end of the notch 162 nearer to the pin 165, so as to limit the throttle-opening movement of the arm 153, and, if the arm 154 is being held by the throttle pedal in a position corresponding to a wide opening of the throttle, to rotate the arm 153 in a clockwise direction to allow the throttle to move towards its closed position under the influence of the spring 152. Such clockwise rotation of the arm 153 takes place against the resistance of the spring 155.

The servo-motor 53, when energised, projects the head 99 into the path of the larger-diameter portion of the roller 169. If the throttle valve is closed when the servo-motor 53 is energised, the head 99 engages the roller 153 and opens the throttle valve, the roller 169 moving away from the arm 153.

It will be seen that the disc 161 acts as a stop, responsive to operation of the servo-motor 25, to limit the opening of the throttle by the pedal control, and that the head 99 acts as a stop, responsive to operation of the servo-motor 53, to prevent closing of the throttle valve beyond a certain degree.

The operation of the throttle closing stop by the clutch-operating servo-motor ensures that the closing of the throttle during a gear-changing operation is properly timed in relation to the release of the clutch.

I claim:

1. Control mechanism for the friction clutch and engine throttle valve of a motor vehicle and responsive to operation of a gear shift member controlling a variable speed gearbox, said control mechanism comprising a servo-motor, means actuated by said gear shift member for energizing said servo-motor, means operated by said servo-motor to disengage the friction clutch, a throttle operating member, means for transmitting movement of said throttle operating member to said throttle valve only in the opening direction, first resilient means acting to close said throttle valve, driver operated throttle control means, second resilient means stronger than said first resilient means connecting said driver operated throttle control member to said throttle operating member, and linkage means connecting said servo-motor to said throttle operating member and including a lost motion connection such that the throttle valve is movable throughout its full range of movement by the throttle control means when the servo-motor is inoperative without taking up the said lost motion, operation of the servo-motor taking up the said lost motion and positioning the throttle operating member to permit substantial closing of the throttle valve by the first resilient means.

2. Control mechanism according to claim 1 comprising a first arm mounted for angular movement about an axis and constituting the throttle operating member, a second arm movable about the said axis, means connecting said second arm to the driver operated throttle control member, said second resilient means being connected to said first and second arms to transmit movement of the second arm to the first arm, and a third arm also movable about said axis and constituting part of said linkage means, the lost motion means being arranged between said first and third arms.

3. Control mechanism according to claim 1 comprising a crosshead constituting the throttle operating member, a rod on which said crosshead is slidably mounted, means connecting said rod to the driver operated throttle control member for longitudinal movement thereby, and stop means on said rod, said second resilient means acting to urge said crosshead towards said stop means.

References Cited in the file of this patent

UNITED STATES PATENTS

| | | |
|---|---|---|
| 2,568,958 | Hey et al. | Sept. 25, 1951 |
| 2,578,142 | Mayrath | Dec. 11, 1951 |
| 2,578,158 | Toot | Dec. 11, 1951 |
| 2,601,628 | Price | June 24, 1952 |
| 2,626,691 | Price | Jan. 27, 1953 |
| 2,638,193 | Schotz | May 12, 1953 |